(12) United States Patent
Anderson (10) Patent No.: US 10,995,955 B2
(45) Date of Patent: May 4, 2021

(54) COMBUSTOR PANEL

(71) Applicant: UNITED TECHNOLOGIES CORPORATION, Farmington, CT (US)

(72) Inventor: Corey D. Anderson, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 486 days.

(21) Appl. No.: 16/052,242

(22) Filed: Aug. 1, 2018

(65) Prior Publication Data
US 2020/0041126 A1    Feb. 6, 2020

(51) Int. Cl.
F23R 3/04    (2006.01)
F23R 3/00    (2006.01)
F23R 3/42    (2006.01)

(52) U.S. Cl.
CPC ............... *F23R 3/04* (2013.01); *F23R 3/005* (2013.01); *F23R 3/42* (2013.01); *F23R 2900/00017* (2013.01); *F23R 2900/03042* (2013.01); *F23R 2900/03044* (2013.01)

(58) Field of Classification Search
CPC .... F23R 3/04; F23R 3/42; F23R 2900/00017; F23R 2900/00018
See application file for complete search history.

(56) References Cited

U.S. PATENT DOCUMENTS

| 6,029,455 A | 2/2000 | Sandelis |
| 2009/0199837 A1* | 8/2009 | Tschirren ................ F23R 3/002 126/144 |
| 2016/0238248 A1 | 8/2016 | Roberge et al. |
| 2017/0176005 A1 | 6/2017 | Rimmer et al. |
| 2017/0184306 A1* | 6/2017 | Tu .......................... F23R 3/002 |
| 2017/0241643 A1 | 8/2017 | Mulcaire et al. |
| 2018/0073737 A1 | 3/2018 | Quach et al. |

FOREIGN PATENT DOCUMENTS

| EP | 3404329 | 11/2018 | |
| EP | 3415819 | 12/2018 | |
| EP | 3415819 A1 * | 12/2018 | .............. F23R 3/002 |
| EP | 3587927 | 1/2020 | |

OTHER PUBLICATIONS

European Patent Office, European Search Report dated Dec. 17, 2019 in Application No. 19189636.4.
European Patent Office, European Office Action dated Oct. 2, 2020 in Application No. 19189636.4.

* cited by examiner

*Primary Examiner* — Steven M Sutherland
(74) *Attorney, Agent, or Firm* — Snell & Wilmer L.L.P (57) ABSTRACT

A heat shield panel arrangement for use in a combustor of a gas turbine engine is disclosed. In various embodiments, the heat shield panel arrangement includes a first panel having a first rail, the first rail having a first distal tip and a first angled outer wall, the first distal tip having a first distal tip length; and a second panel having a second rail, the second rail having a second distal tip and a second angled outer wall, the second distal tip having a second distal tip length. The first distal tip length is less than the second distal tip length and the first angled outer wall is substantially parallel to the second angled outer wall with a gap formed therebetween.

15 Claims, 7 Drawing Sheets

COMBUSTOR PANEL

FIELD

The present disclosure relates to gas turbine engines and, more particularly, to heat shield panels used in the combustors of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and fan sections.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more shells and one or more panels attached to the shells. Cooling cavities reside between the panels and the shells and fluidly couple impingement apertures extending through the shells with effusion apertures extending through the panels. Rails extending about the periphery of the panels offset the interior of the panels from the shells to form the cooling cavities.

SUMMARY

A heat shield panel arrangement for use in a combustor of a gas turbine engine is disclosed. In various embodiments, the heat shield panel arrangement includes a first panel having a first rail, the first rail having a first distal tip and a first angled outer wall, the first distal tip having a first distal tip length; and a second panel having a second rail, the second rail having a second distal tip and a second angled outer wall, the second distal tip having a second distal tip length. The first distal tip length has a value less than the second distal tip length and the first angled outer wall is substantially parallel to the second angled outer wall with a gap formed therebetween.

In various embodiments, the first panel and the second panel are disposed in an axial direction along the combustor and the gap extends in a circumferential direction about the combustor. In various embodiments, the first panel is disposed at a first angle with respect to a longitudinal axis and the second panel is disposed at a second angle with respect to the longitudinal axis.

In various embodiments, a relative disposition between the first panel and the second panel defines an angular difference equal to the difference between the first angle and the second angle. In various embodiments, the first angled outer wall is oriented with respect to a first panel hot side surface at a first cutting-angle that is equal to about twice the angular difference. In various embodiments, the second angled outer wall is oriented with respect to a second panel hot side surface at a second cutting-angle that is equal to about ninety degrees minus the angular difference.

In various embodiments, the first rail is part of a first boundary wall extending peripherally about the first panel and the second rail is part of a second boundary wall extending peripherally about the second panel. In various embodiments, the first rail includes a first plurality of impingement holes extending through the first rail from a first inner wall to the first angled outer wall. In various embodiments, the second rail includes a second plurality of impingement holes extending through the second rail from a second inner wall to the second angled outer wall.

In various embodiments, the first rail includes a first rail thickness and the second rail includes a second rail thickness equal to the first rail thickness. In various embodiments, the first panel includes a first panel thickness and the second panel includes a second panel thickness equal to the first panel thickness.

A gas turbine engine is disclosed. In various embodiments, the gas turbine engine includes a combustor and a heat shield panel arrangement for use in the combustor. The combustor includes a first panel having a first rail, the first rail having a first distal tip and a first angled outer wall, the first distal tip having a first distal tip length; and a second panel having a second rail, the second rail having a second distal tip and a second angled outer wall, the second distal tip having a second distal tip length. The first distal tip length has a value less than the second distal tip length and the first angled outer wall is substantially parallel to the second angled outer wall.

In various embodiments, a gap is formed between the first angled wall and the second angled wall. In various embodiments, the first panel and the second panel are disposed in an axial direction along the combustor and the gap extends in a circumferential direction about the combustor. In various embodiments, the first rail includes a first plurality of impingement holes extending through the first rail from a first inner wall to the first angled outer wall and wherein the second rail includes a second plurality of impingement holes extending through the second rail from a second inner wall to the second angled outer wall. In various embodiments, the first rail includes a first rail thickness and the second rail includes a second rail thickness equal to the first rail thickness, and the first panel includes a first panel thickness and the second panel includes a second panel thickness equal to the first panel thickness.

A method of forming a panel arrangement for use in a combustor is disclosed. In various embodiments, the method includes the steps of fabricating a first panel having a first rail and a second panel having a second rail; determining a first cutting angle associated with the first rail and a second cutting angle associated with the second rail; removing a first portion from the first rail corresponding with the first cutting angle to expose a first angled outer wall; removing a second portion from the second rail corresponding with the second cutting angle to expose a second angled outer wall; and assembling the first panel and the second panel to a support shell, such that a gap having parallel sides is formed between the first angled outer wall and the second angled outer wall.

In various embodiments, the first panel and the second panel are configured for disposition in an axial direction along the combustor and the gap is configured to extend in a circumferential direction about the combustor. In various embodiments, the first rail includes a first rail thickness and the second rail includes a second rail thickness equal to the first rail thickness. In various embodiments, the first panel includes a first panel thickness and the second panel includes a second panel thickness equal to the first panel thickness. In various embodiments, the method further includes drilling one or more first impingement holes into the first rail and drilling one or more second impingement holes into the second rail.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
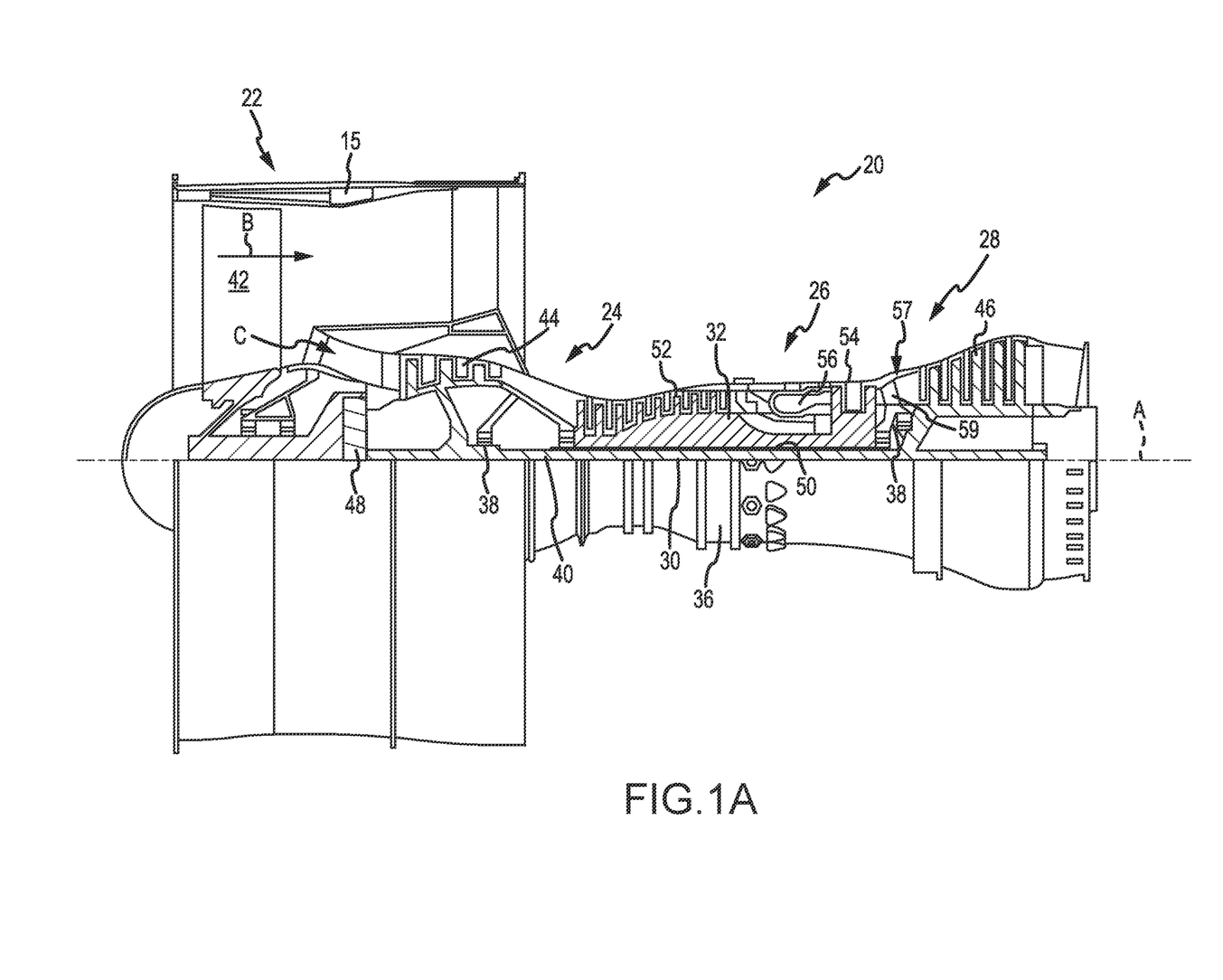
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
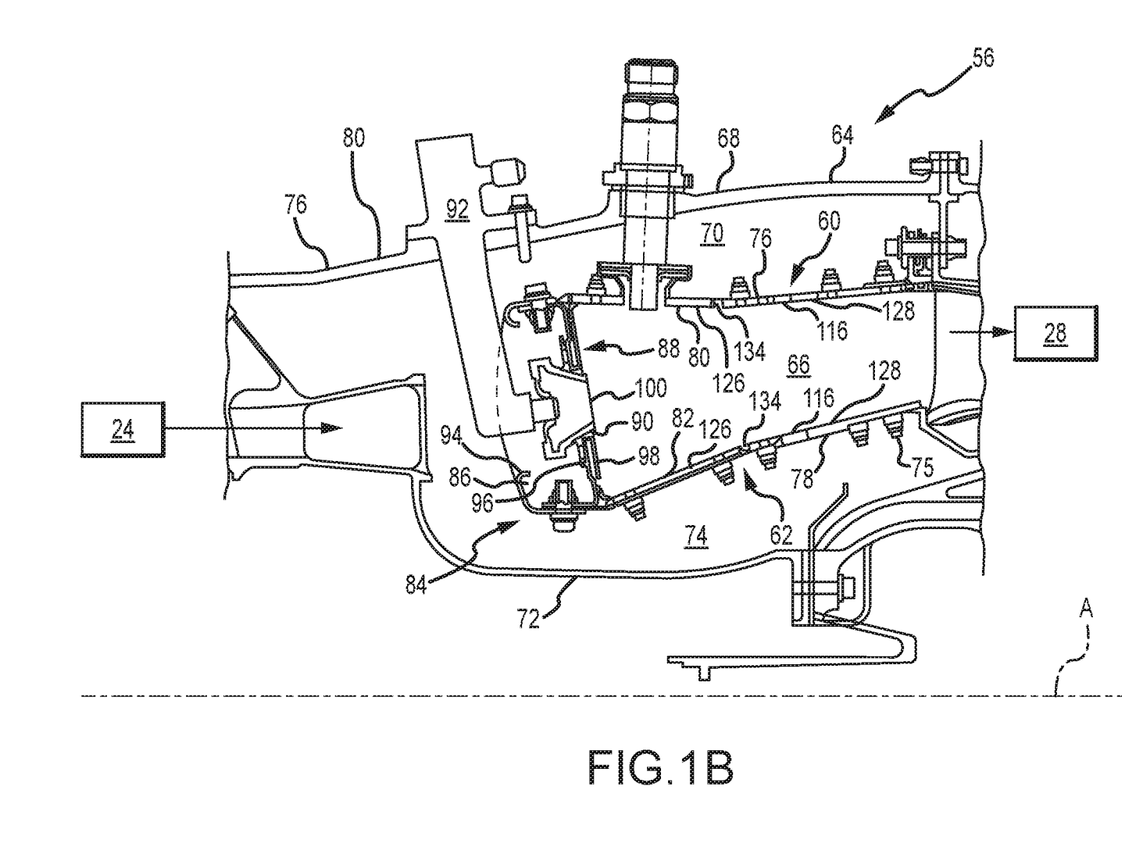
FIG. 1B is a cross sectional schematic view of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, the bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces core compressed air into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum 74 is also introduced into the combustion chamber 66 via a plurality of orifices 116, which may include dilution holes or air feed holes of various dimension. The outer support shell 76 may also include a plurality of impingement holes (discussed further below) that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 1C:
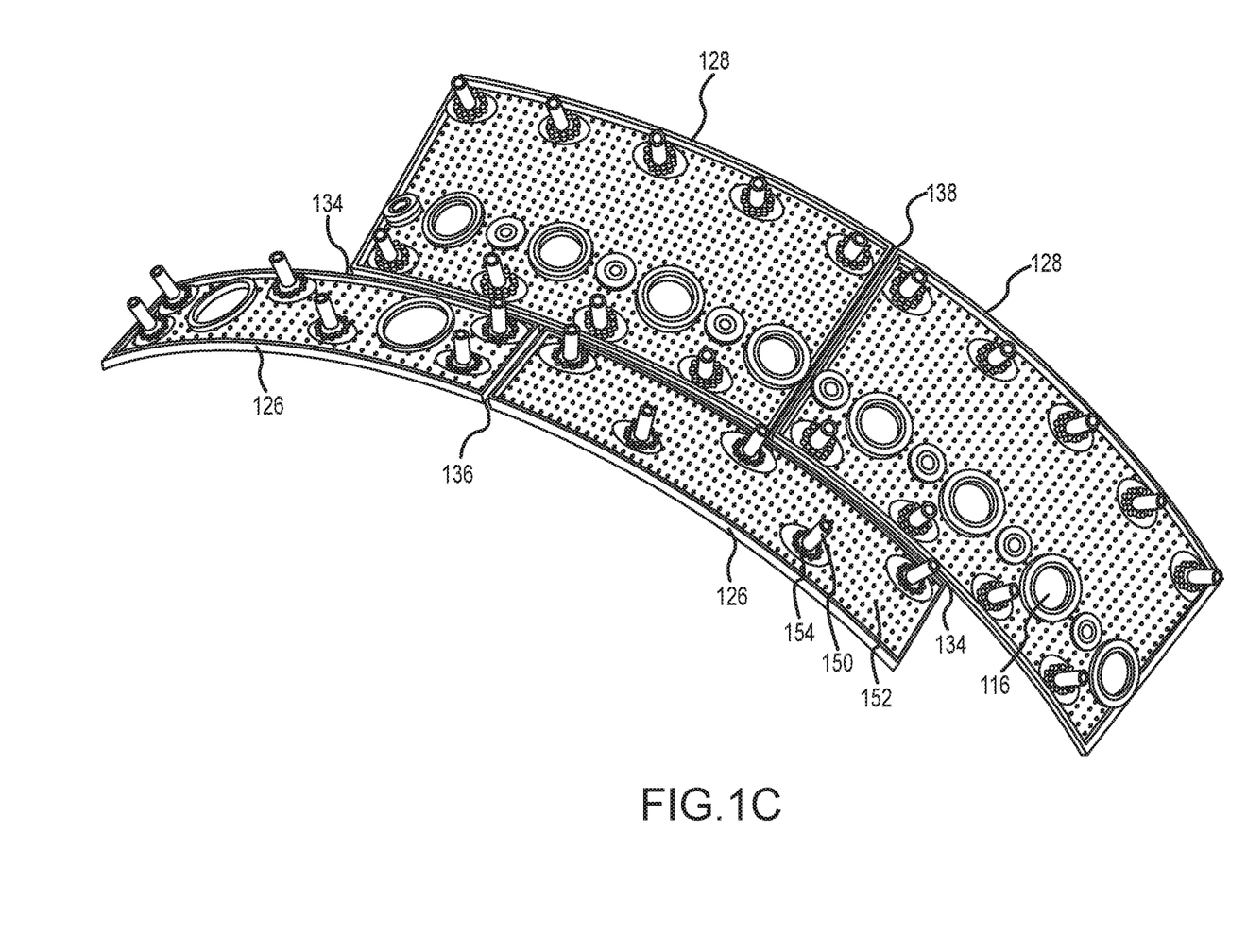
FIG. 1C is a perspective schematic view of a heat shield panel arrangement of a combustor, viewing from the cold side, according to various embodiments.

Turning now to FIG. 1C (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1C is a plurality of orifices 116, that may include dilution holes or air feed holes of various dimension, a plurality of effusion holes 152 and a shield attachment mechanism, which includes a stud 150 and a plurality of spacer pins 154.

Figure 2A:
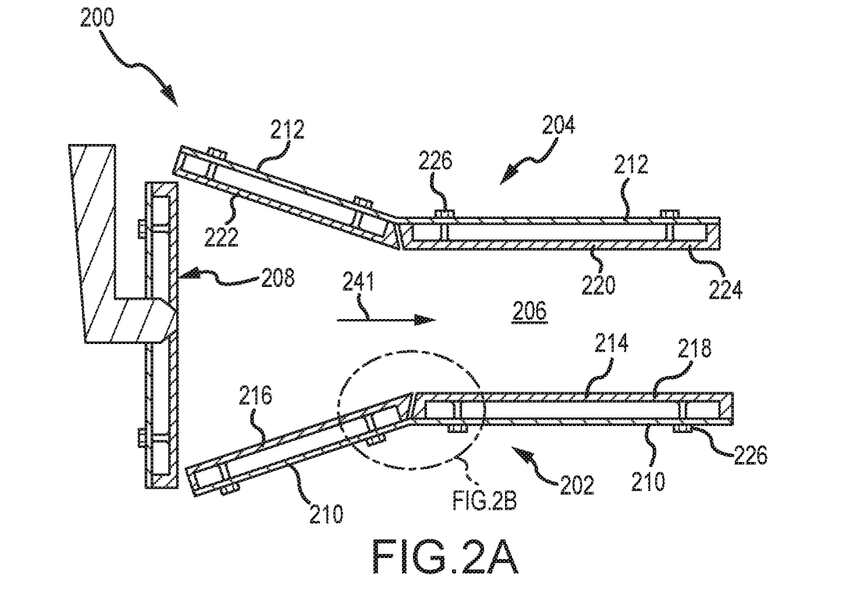
FIGS. 2A and 2B are cross sectional schematic views of a combustor section and a panel configuration within a combustor section, in accordance with various embodiments.
Figure 2B:
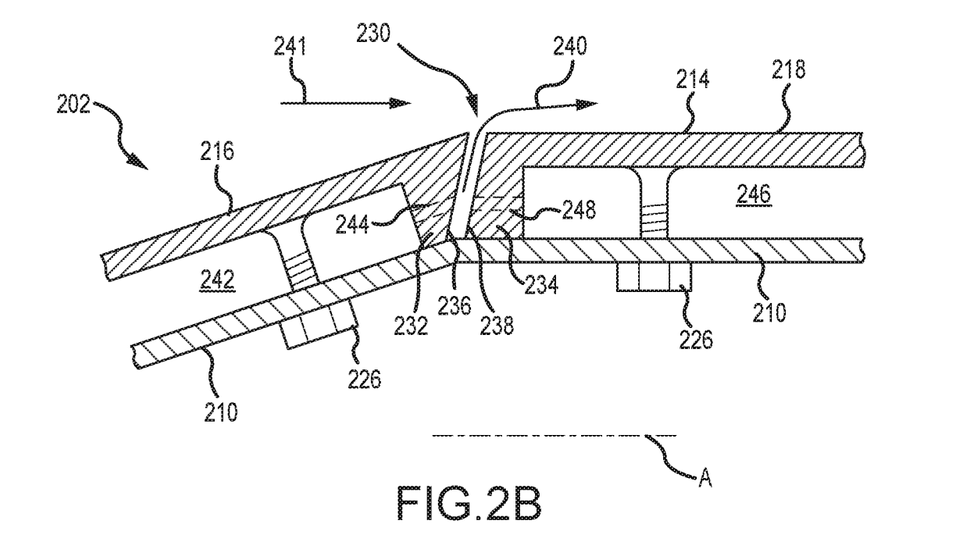

Referring now to FIGS. 2A and 2B, a schematic view of a combustor 200 and a close-up schematic view of a portion of an inner liner assembly 202, respectively, are illustrated, in accordance with various embodiments. In various embodiments, the combustor 200 shares many of the features of the combustor 56 above described with reference to FIG. 1C. For example, in various embodiments, the combustor 200 may generally include an outer liner assembly 204 and the inner liner assembly 262. A combustion chamber 206, positioned within the combustor 200, has a generally annular configuration, defined by and comprising the outer liner assembly 204, the inner liner assembly 202 and a bulkhead liner assembly 208. The outer liner assembly 204 and the inner liner assembly 202 are generally cylindrical and radially spaced apart, with the bulkhead liner assembly 208 positioned generally at a forward end of the combustion chamber 206. The inner liner assembly 202 includes an inner support shell 210 and the outer liner assembly 204 includes an outer support shell 212. The inner support shell 210 supports one or more inner panels 214, such as, for example, a first inner panel 216 and a second inner panel 218. Similarly, the outer support shell 212 supports one or more outer panels 220, such as, for example, a first outer panel 222 and a second outer panel 224. Each of the inner panels 214 and the outer panels 220 may be formed of a plurality of floating panels that are generally rectilinear and manufactured from, for example, a nickel based super alloy that may be coated with a ceramic or other temperature resistant material, and are arranged to form a panel configuration mounted to the respective inner support shell 210 and outer support shell 212. In various embodiments, the combination of the inner support shell 210 and the inner panels 214 is referred to an inner heat shield or inner heat shield liner, while the combination of the outer support shell 212 and the outer panels 220 is referred to as an outer heat shield or outer heat shield liner. In various embodiments, the panels are secured to the shells via one or more attachment mechanisms 226, which may each comprise a threaded stud and nut assembly.

Referring more specifically to FIG. 2B, a close-up schematic view of a portion of the inner liner assembly 202 is illustrated, in accordance with various embodiments. In various embodiments, as above described with reference to FIG. 2A, the inner liner assembly 202 comprises the first inner panel 216 and the second inner panel 218 secured to the inner support shell 210. The first inner panel 216 and the second inner panel 218 generally extend axially with respect to an engine central longitudinal axis A. In various embodiments, a gap 230 extends circumferentially between an aft rail 232 of the first inner panel 216 and a forward rail 234 of the second inner panel 218. In various embodiments, an aft wall 236 of the aft rail 232 (or the forward or first inner panel 216) and a forward wall 238 of the forward rail 234 (of the aft or second inner panel 218) are spaced apart and configured to provide a gap stream 240 flowing from the gap 230 to mix with a main gas stream 241 flowing through the combustor. In various embodiments, the gap stream 240 may comprise cooling air flowing from a first cavity 242, defined by the space between the first inner panel 216 and the inner support shell 210, through a first rail impingement hole 244 (or first plurality of impingement holes) into the gap 230, and from a second cavity 246, defined by the space between the second inner panel 218 and the inner support shell 210, through a second rail impingement hole 248 (or second plurality of impingement holes) into the gap 230. In various embodiments, the gap stream 240 may also comprise cooling fluid that might leak between spaces occurring between the aft rail 232 and the inner support shell 210 and the forward rail 234 and the inner support shell 210. In various embodiments, and as described further below, the aft wall 236 and the forward wall 238 are configured to reside substantially parallel to one another, thereby reducing entrainment or recirculation of the main gas stream 241 flowing through the combustor 200.

In various embodiments, the aft rail 232 and the forward rail 234 are components or sections of, respectively, peripherally extending rail members that extend about the periphery or perimeter of the first inner panel 216 and the second inner panel 218. In various embodiments, the aft rail 232, together with three additional rails (as illustrated, for example, in FIG. 1C), define, in part, a boundary wall that extends lengthwise about all four sides of the first inner panel 216 at or near the periphery or perimeter of the first inner panel 216. Likewise, in various embodiments, the forward rail 234, together with three additional rails (as illustrated, for example, in FIG. 1C), define, in part, a boundary wall that extends lengthwise about all four sides of the second inner panel 218 at or near the periphery or perimeter of the second inner panel 218. In various embodiments, the boundary walls extends continuously about or near the periphery or perimeter of the first inner panel 216 and the second inner panel 218. In various embodiments, the boundary walls project in a radial direction from the inner panels (or outer panels) and are configured to make contact with or abut the surfaces of the corresponding inner or outer support shells, thereby defining a cooling chamber between the panels and the corresponding inner or outer shells.

Figure 3A:
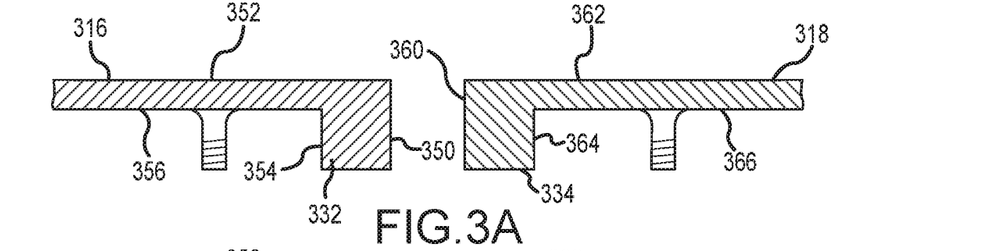
FIGS. 3A, 3B, 3C, 3D and 3E are cross sectional views of combustor panels illustrating a series of steps employed to form a combustor panel rail, in accordance with various embodiments.

Referring now to FIGS. 3A, 3B, 3C, 3D and 3E, a series of steps involved in fabricating an adjacent pair of panels, such as, for example, the first inner panel 216 and the second inner panel 218, described above with reference to FIG. 2B, having a gap there between defined by substantially parallel walls, is described. Referring to FIG. 3A, a first panel 316 and a second panel 318, having a first rail 332 and a second rail 334, respectively, are fabricated, using techniques such as, for example, casting or additive manufacture. In various embodiments, following fabrication, the first rail 332 may be characterized as having a first outer wall 350 that is substantially perpendicular to a first hot side surface 352 of the first panel 316 and a first inner wall 354 that is substantially perpendicular to a first cold side surface 356 of the first panel 316. Similarly, in various embodiments, following fabrication, the second rail 334 may be characterized as having a second outer wall 360 that is substantially perpendicular to a second hot side surface 362 of the second panel 318 and a second inner wall 364 that is substantially perpendicular to a second cold side surface 366 of the second panel 318. Reference to being perpendicular is, here, with respect to axial directions along the panel surfaces (e.g., the hot and cold surfaces) and, therefore, contemplates any curvature of the panel in the circumferential direction.

Figure 3B:
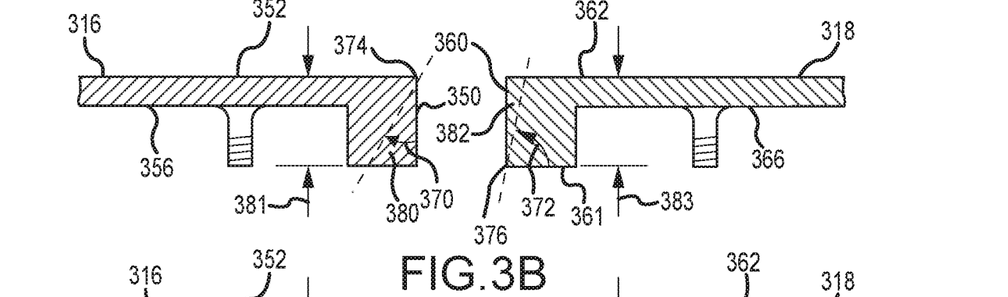
Figure 3C:
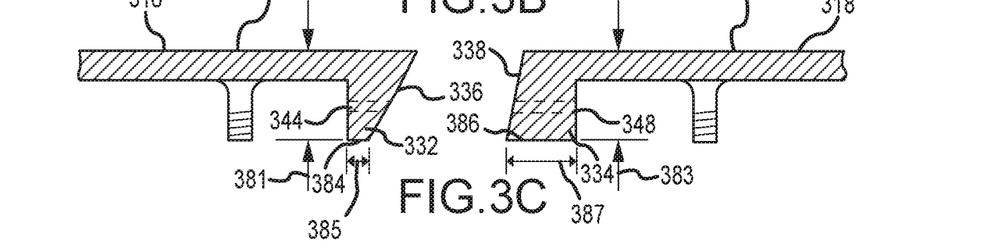
Figure 3D:
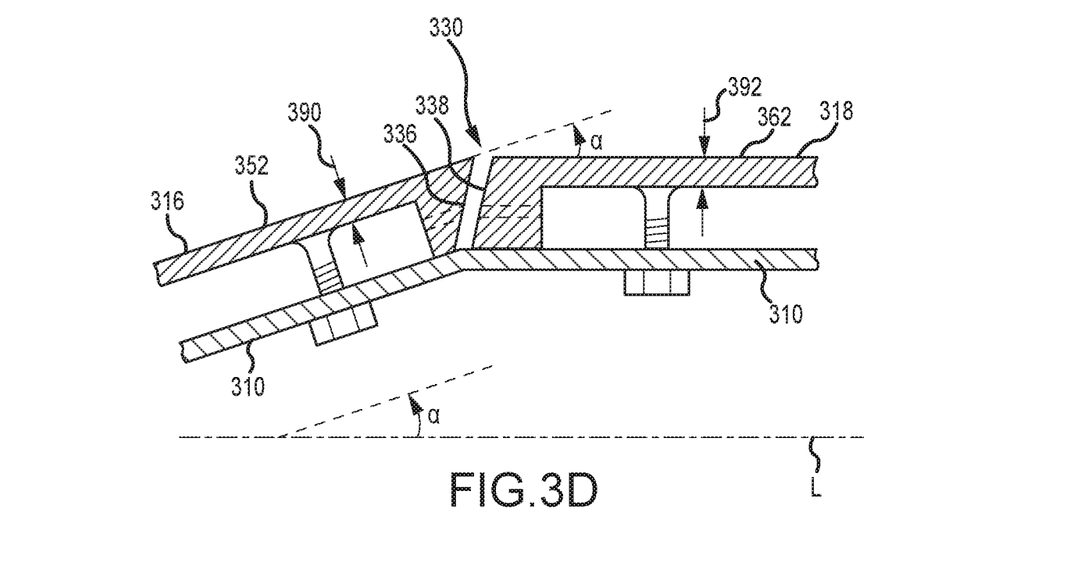

Referring now to FIGS. 3B and 3C, a first cutting angle 370 associated with the first rail 332 of the first panel 316 and a second cutting angle 372 associated with the second rail 334 of the second panel 318 are determined, according to the respective orientations of the first panel 316 and the second panel 318 when secured to a support shell 310 (see FIG. 3D). In various embodiments, the first cutting angle 370 extends from a first corner 374, defined by an intersection of the first outer wall 350 and the first hot side surface 352, in a direction toward the first cold side surface 356. Similarly, in various embodiments, the second cutting angle 372 extends from a second corner 376, defined by an intersection of the second outer wall 360 and a shelf surface 361 of the second rail 334, in a direction toward the second hot side surface 362. Following determination of the first cutting angle 370, a first portion 380 of the first rail 332 is removed, e.g., by machining away the first portion 380. Similarly, following determination of the second cutting angle 372, a second portion 382 of the second rail 334 is removed, e.g., by machining away the second portion 382. In various embodiments, the machining away of the first portion 380 and the second portion 382 is performed by grinding or cutting or other suitable means.

Following the machining away of the first portion 380 and the second portion 382, respectively, the first rail 332 of the first panel 316 includes a first angled outer wall 336 and the second rail 334 of the second panel 318 includes a second angled outer wall 338. In various embodiments, following the machining away of the first portion 380 and the second portion 382, respectively, the first rail 332 will include a first distal tip 384 having a first distal tip length 385 and the second rail 334 will include a second distal tip 386 having a second distal tip length 397. In various embodiments, the first distal tip length 385 will have a value less than the second distal tip length 387; excepting, however, those embodiments where the angle α (see FIG. 3D) is equal to zero. In various embodiments, both prior to and following the machining away of the first portion 380 and the second portion 382, respectively, the first rail 332 will have a first rail thickness 381 defined by a distance between the first hot side surface 352 and the first distal tip 384 and the second rail 334 will have a second rail thickness 383 defined by a distance between the second hot side surface 362 and the second distal tip 386. In various embodiments, both prior to and following the machining away of the first portion 380 and the second portion 382, the first rail thickness 381 is equal to the second rail thickness 383. In various embodiments, one or more first impingement holes 344 are drilled into the first rail 332 and one or more second impingement holes 348 are drilled into the second rail 334.

Referring now to FIG. 3D, the first panel 316 and the second panel 318 are illustrated secured to the support shell 310. As illustrated, a gap 330, through which a gap stream may flow, is characterized as having a substantially parallel geometry between the first rail 332 and the second rail 334, as a result of the first angled outer wall 336 being cut at the first cutting angle 370 and the second angled outer wall 338 being cut at the second cutting angle 372. In various embodiments, where the first panel 316 and the second panel 318 are substantially similar in geometry—e.g., where a first thickness 390 of the first panel 316 and a second thickness 392 of the second panel 318 are the same and where the dimensions of the first rail 332 and the second rail 334, prior to cutting, are the same—the first cutting angle 370 and the second cutting angle 372 may be related by the relative positioning of the panels. For example, in various embodiments, the support shell 310 is configured to orient the first panel 316 and the second panel 318 at an angle $\alpha$ with respect to each other. In various embodiments, the angle $\alpha$ may be defined as the angular difference in orientation of the first hot side surface 352 and the second hot side surface 362 with respect to axial lines on the panel surfaces in the direction of a longitudinal axis L.

Figure 3E:
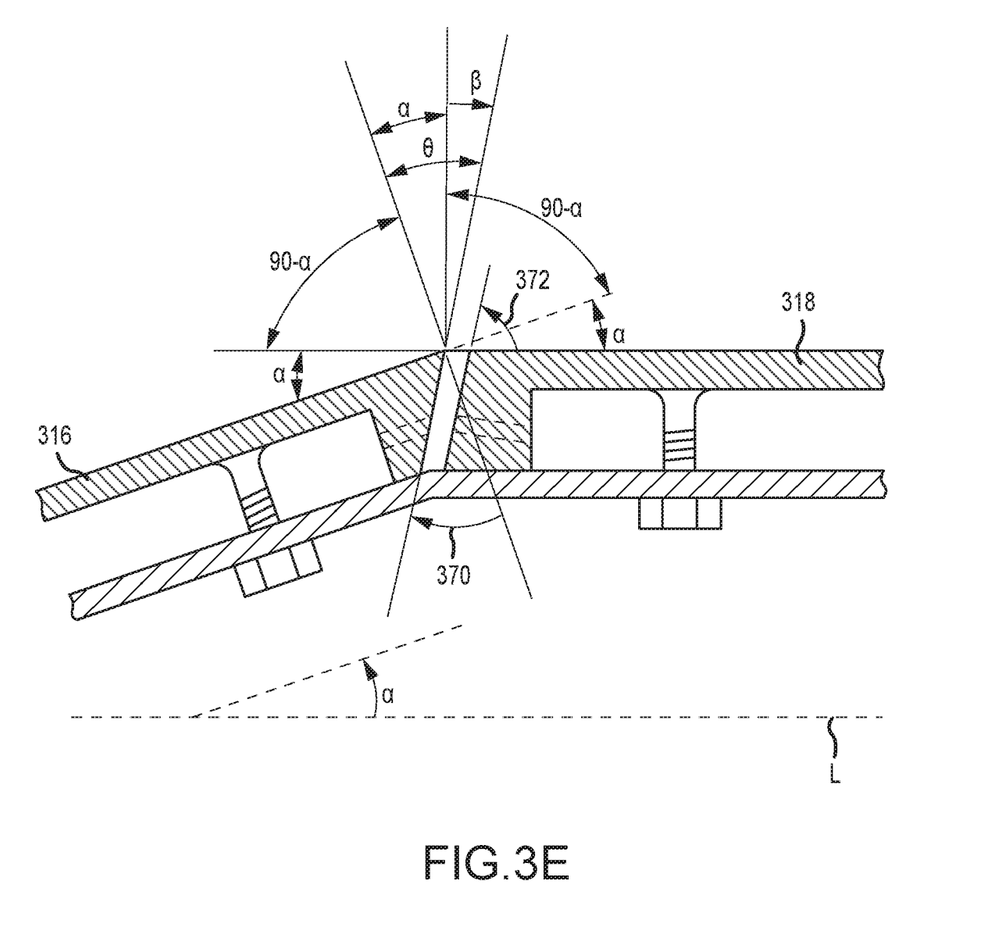

Referring to FIG. 3E (with continued reference to FIG. 3D), a geometric interpretation of the first cutting angle 370 and the second cutting angle 372 with respect to the angle $\alpha$ and to a second angle $\beta$ is provided. In various embodiments, for a given angle $\alpha$, the first cutting angle 370 and the second cutting angle 372 may be described as a function of the second angle $\beta$ which, in various embodiments, may take on a value from $0 \leq \beta \leq \alpha$. Thus, for example, in various embodiments, where $\beta = \alpha$, the first cutting angle 370 (also depicted as $\theta$) will equal twice $\alpha$ (or $2\alpha$) and the second cutting angle 372 will equal ninety degrees minus $\alpha$ (or $90° - \alpha$). Similarly, in various embodiments, where $\beta = 0$, the first cutting angle 370 will equal $\alpha$ and the second cutting angle 372 will equal ninety degrees (or $90°$). In various embodiments, for a given $\alpha$, the second angle $\beta$ can also be described as running from $-\alpha \leq \beta < 0$, with the result being the gap 330 is oriented such that the gap stream (e.g., the gap stream 240 described above with reference to FIG. 2B) includes a vector component oriented in a direction against the main gas stream (e.g., the main gas stream 241, also described above with reference to FIG. 2B).

Figure 4:
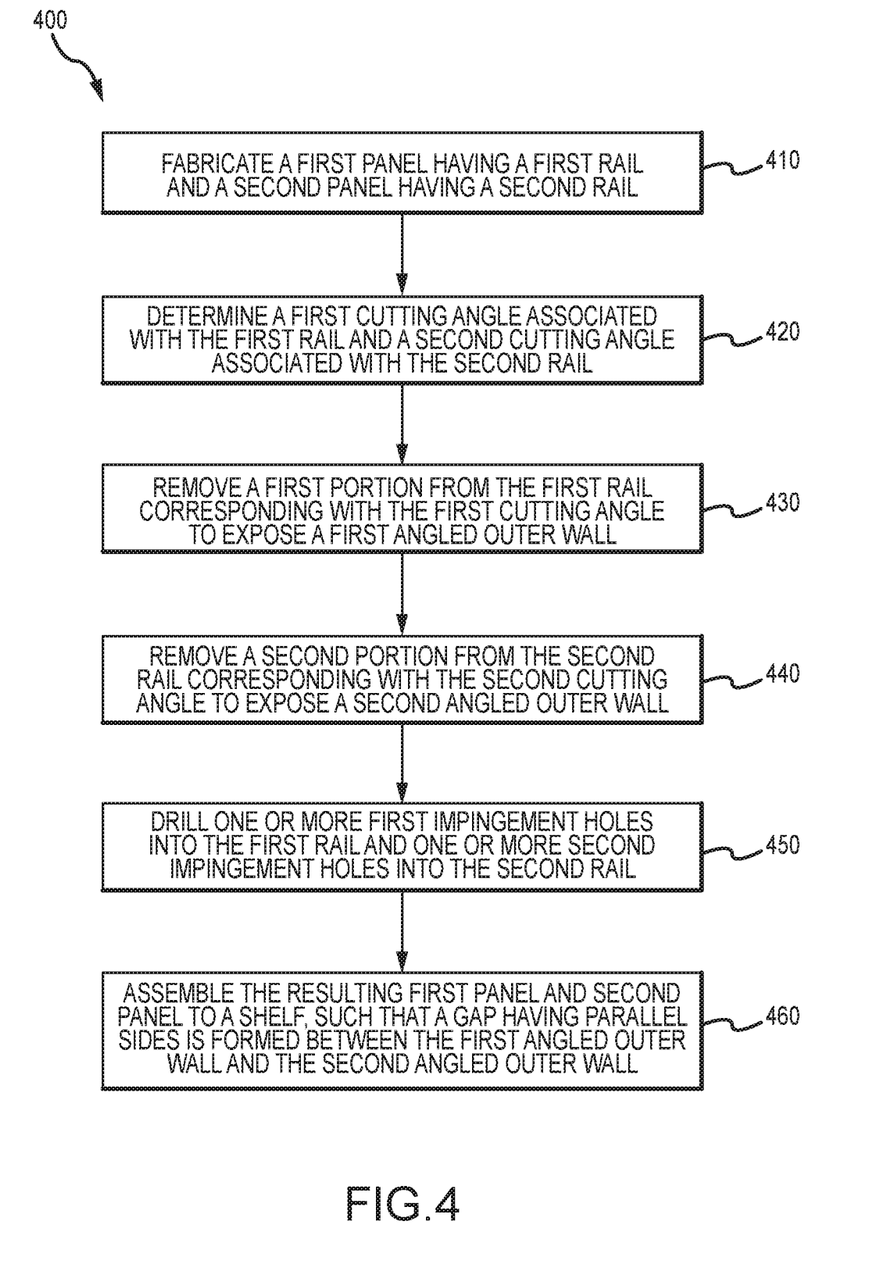
FIG. 4 is a flowchart that illustrates a series of steps used to fabricate a pair of adjacently positioned panels, in accordance with various embodiments.

Referring now to FIG. 4, a flowchart 400 is provided that illustrates a series of steps used to fabricate a pair of adjacently positioned panels that define a parallel gap between adjacently positioned rails corresponding to the panels. In a first step 410, a first panel having a first rail is fabricated and a second panel having a second rail is fabricated. In various embodiments, the fabrication is carried out using casting or additive manufacturing processes. In a second step 420, a first cutting angle associated with the first rail is determined and a second cutting angle associated with the second rail is determined. In various embodiments, the first cutting angle and the second cutting angle are determined such that a parallel gap between the first rail and the second rail results following assembly on a shelf. In various embodiments, the first cutting angle and the second cutting angle may be determined by geometric formula based on the geometry of the shelf. In a third step 430, a first portion from the first rail corresponding with the first cutting angle is removed to expose a first angled outer wall. In a fourth step 440, a second portion from the second rail corresponding with the second cutting angle is removed to expose a second angled outer wall. In various embodiments, the removal is carried out by grinding or cutting processes. In a fifth step 450, one or more first impingement holes are drilled into the first rail and one or more second impingement holes are drilled into the second rail. In a sixth step 460, the resulting first panel and second panel are assembled to the shelf, such that a gap having parallel sides is formed between the first angled outer wall and the second angled outer wall. In various embodiments, additional steps are performed on the first and second panels, such as, for example, application of metallic or ceramic coatings and the drilling of impingement or effusion holes or dilution holes.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel arrangement for use in a combustor of a gas turbine engine, comprising:
    a first panel having a first rail, the first rail having a first distal tip and a first angled outer wall, the first distal tip having a first distal tip length and the first angled outer wall extending at a first cutting-angle from a first panel hot side surface to the first distal tip; and
    a second panel having a second rail, the second rail having a second distal tip and a second angled outer wall, the second distal tip having a second distal tip length and the second angled outer wall extending at a second cutting-angle from a second panel hot side surface to the second distal tip,
        wherein the first cutting-angle equals a value that is different from the second cutting-angle and
        wherein the first distal tip length is less than the second distal tip length and wherein the first angled outer wall is substantially parallel to the second angled outer wall with a gap formed therebetween.

2. The heat shield panel arrangement of claim 1, wherein the first panel and the second panel are disposed in an axial direction along the combustor and wherein the gap extends in a circumferential direction about the combustor.

3. The heat shield panel arrangement of claim 2, wherein the first panel is disposed at a first angle with respect to a longitudinal axis and the second panel is disposed at a second angle with respect to the longitudinal axis.

4. The heat shield panel arrangement of claim 3, wherein a relative disposition between the first panel and the second panel defines an angular difference equal to the difference between the first angle and the second angle.

5. The heat shield panel arrangement of claim 4, wherein the first angled outer wall is oriented with respect to the first panel hot side surface at the first cutting-angle, which is equal to twice the angular difference.

6. The heat shield panel arrangement of claim 5, wherein the second angled outer wall is oriented with respect to the second panel hot side surface at the second cutting-angle, which is equal to ninety degrees minus the angular difference.

7. The heat shield panel arrangement of claim 1, wherein the first rail is part of a first boundary wall extending peripherally about the first panel and the second rail is part of a second boundary wall extending peripherally about the second panel.

8. The heat shield panel arrangement of claim 7, wherein the first rail includes a first plurality of impingement holes extending through the first rail from a first inner wall to the first angled outer wall and the second rail includes a second plurality of impingement holes extending through the second rail from a second inner wall to the second angled outer wall.

9. The heat shield panel arrangement of claim 1, wherein the first rail includes a first rail thickness and the second rail includes a second rail thickness equal to the first rail thickness.

10. The heat shield panel arrangement of claim 9, wherein the first panel includes a first panel thickness and the second panel includes a second panel thickness equal to the first panel thickness.

11. A gas turbine engine, comprising:
    a combustor; and
    a heat shield panel arrangement for use in the combustor, comprising:
        a first panel having a first rail, the first rail having a first distal tip and a first angled outer wall, the first distal tip having a first distal tip length and the first angled outer wall extending at a first cutting-angle from a first panel hot side surface to the first distal tip; and
        a second panel having a second rail, the second rail having a second distal tip and a second angled outer wall, the second distal tip having a second distal tip length and the second angled outer wall extending at a second cutting-angle from a second panel hot side surface to the second distal tip,
            wherein the first cutting-angle equals a value that is different from the second cutting-angle and
            wherein the first distal tip length is less than the second distal tip length and wherein the first angled outer wall is substantially parallel to the second angled outer wall.

12. The gas turbine engine of claim 11, wherein a gap is formed between the first angled outer wall and the second angled outer wall.

13. The gas turbine engine of claim 12, wherein the first panel and the second panel are disposed in an axial direction along the combustor and wherein the gap extends in a circumferential direction about the combustor.

14. The gas turbine engine of claim 13, wherein the first rail includes a first plurality of impingement holes extending through the first rail from a first inner wall to the first angled outer wall and wherein the second rail includes a second plurality of impingement holes extending through the second rail from a second inner wall to the second angled outer wall.

15. The gas turbine engine of claim 14, wherein the first rail includes a first rail thickness and the second rail includes a second rail thickness equal to the first rail thickness and wherein the first panel includes a first panel thickness and the second panel includes a second panel thickness equal to the first panel thickness.

* * * * *